May 26, 1953  F. E. SMITH  2,639,894
PIPE AND CASING TONGS
Filed Nov. 17, 1951  6 Sheets-Sheet 1

INVENTOR.
FRED E. SMITH
BY
ATTORNEYS

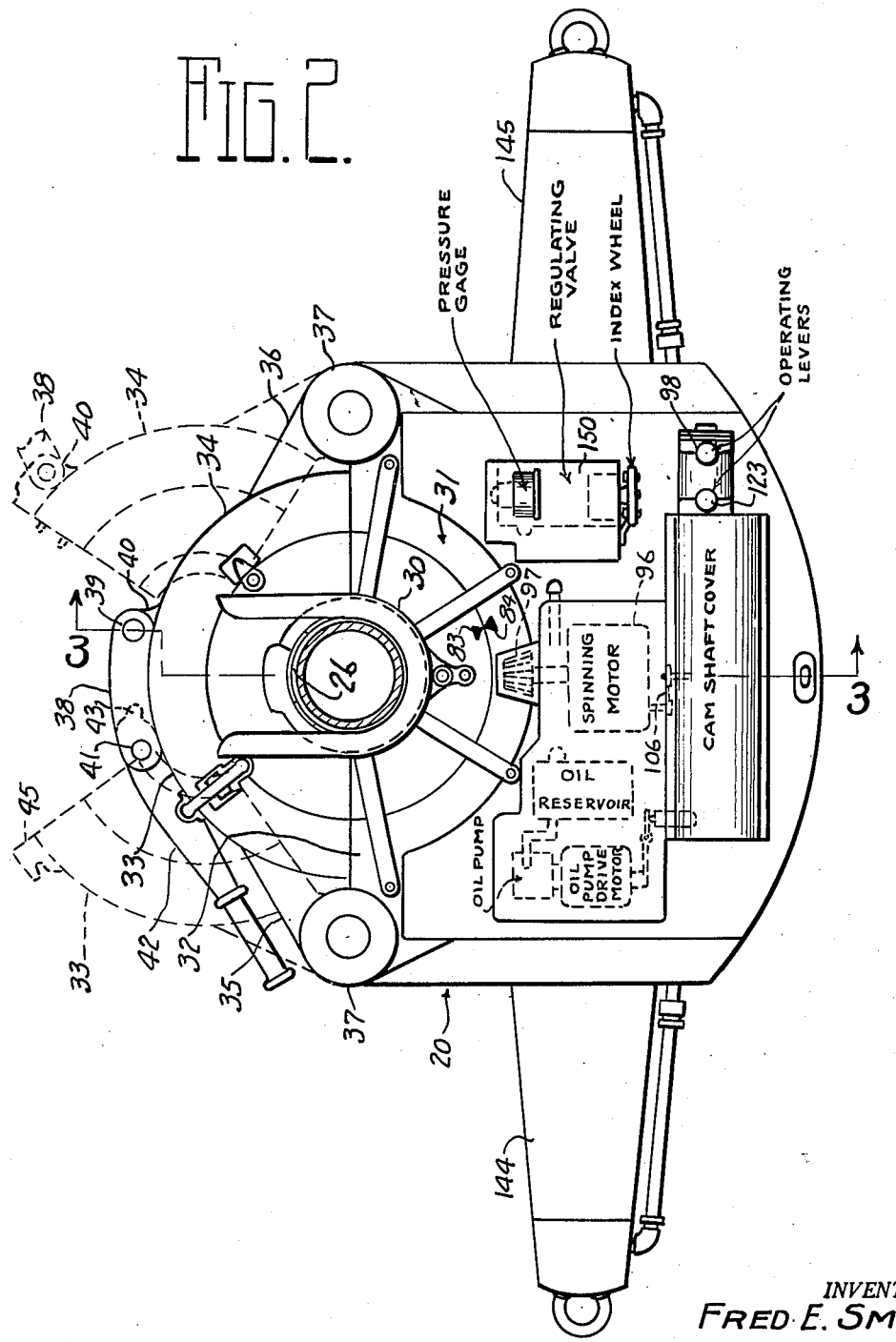

May 26, 1953  F. E. SMITH  2,639,894
PIPE AND CASING TONGS
Filed Nov. 17, 1951  6 Sheets-Sheet 3
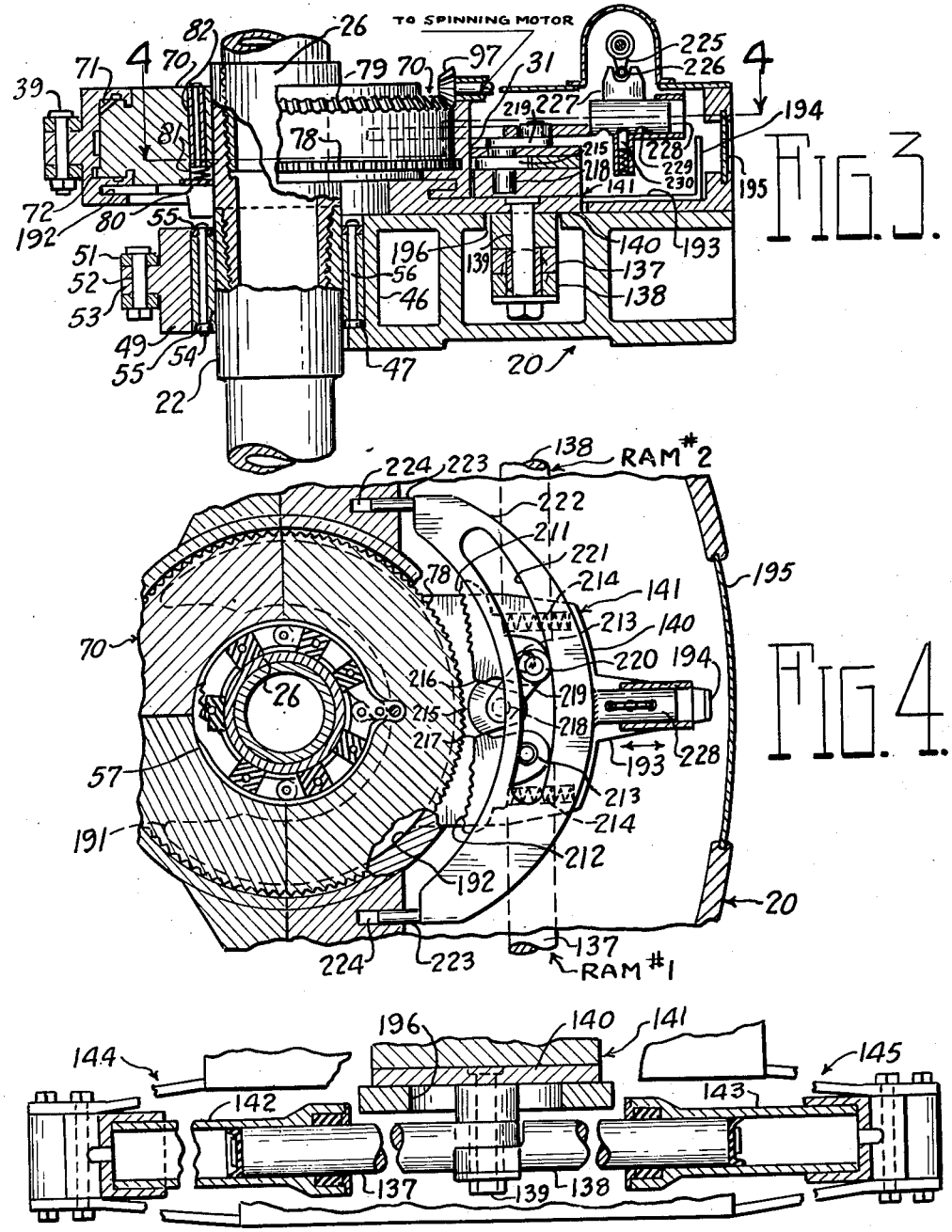
INVENTOR.
FRED E. SMITH
BY
ATTORNEYS

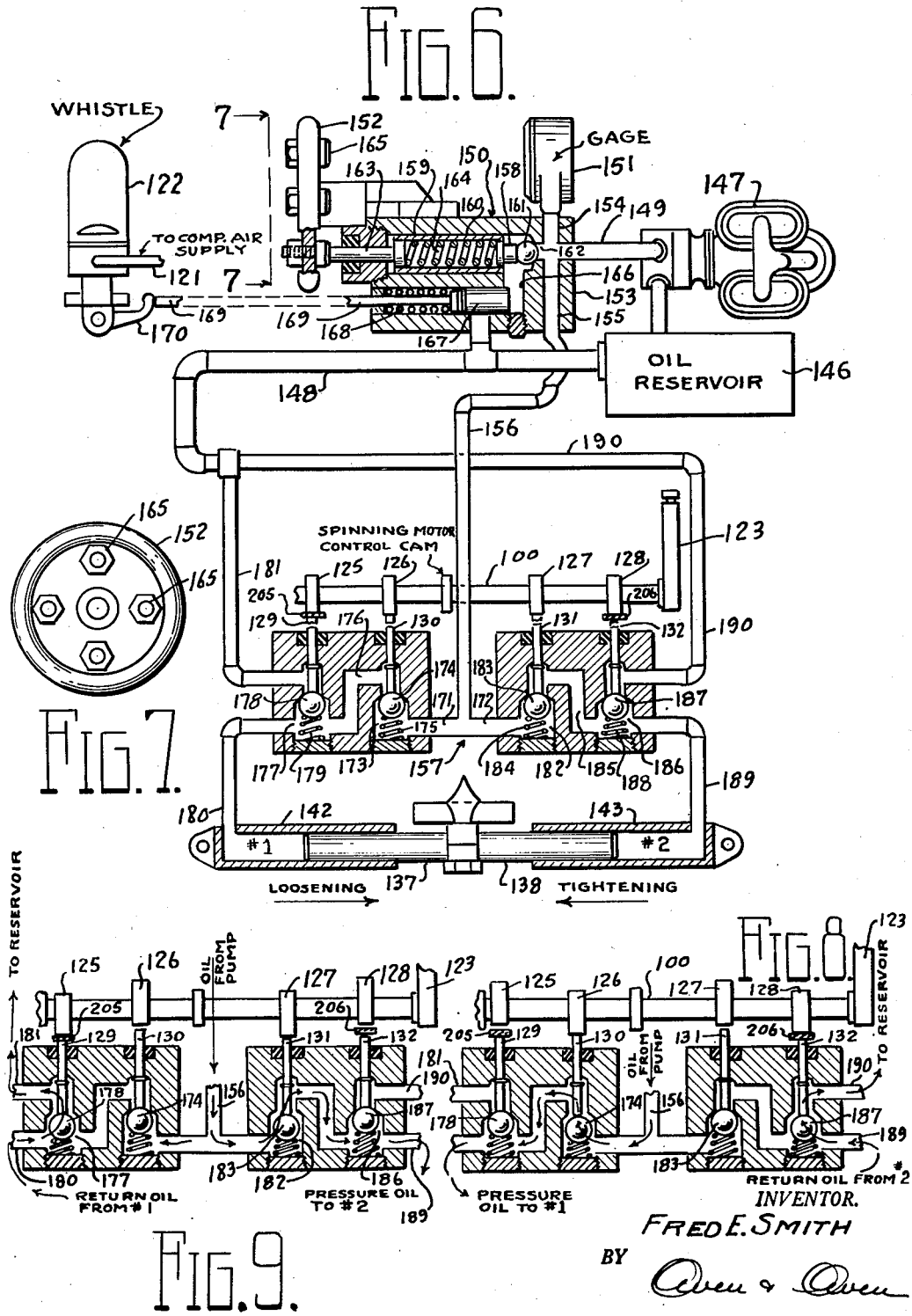

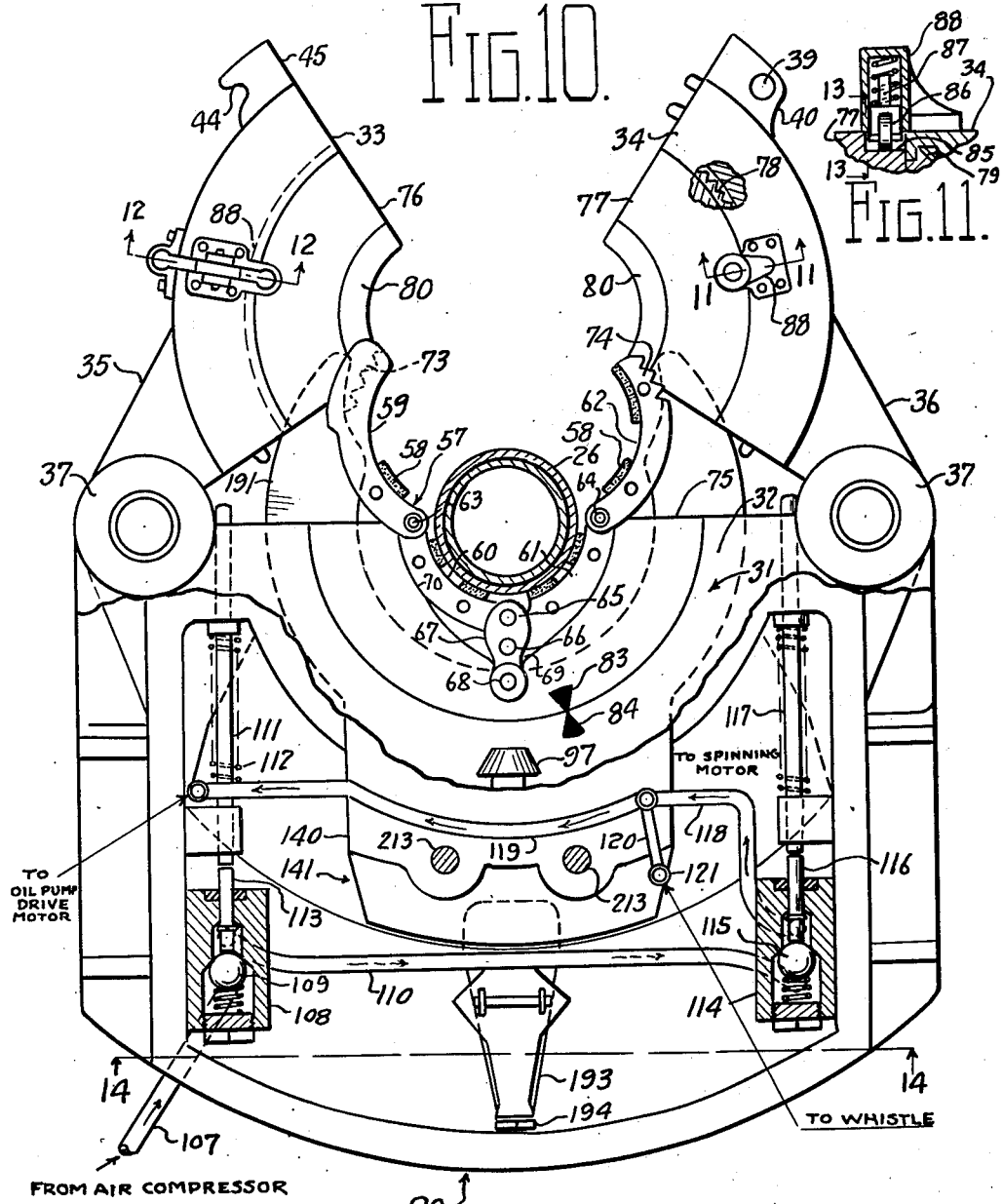

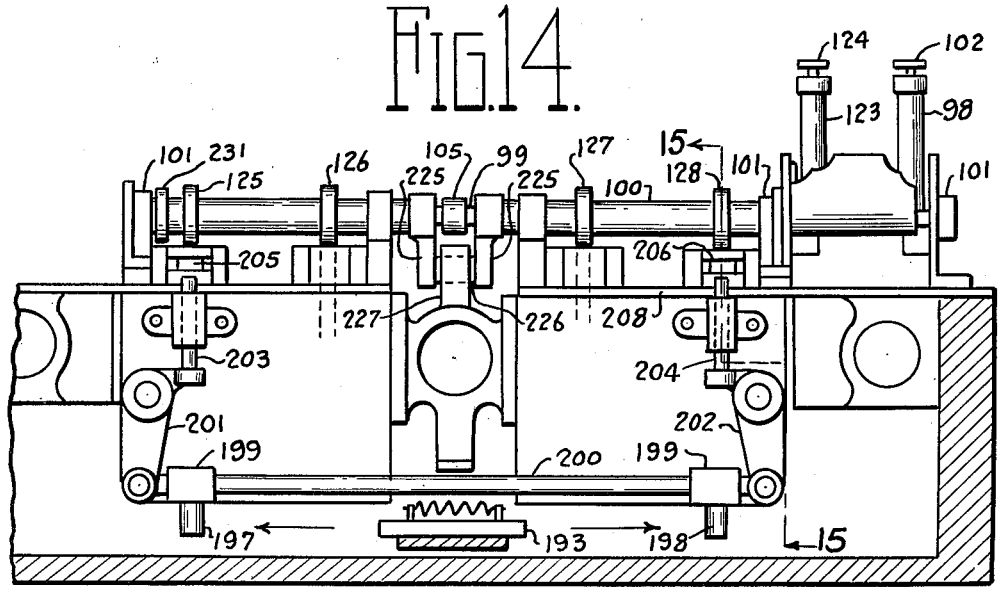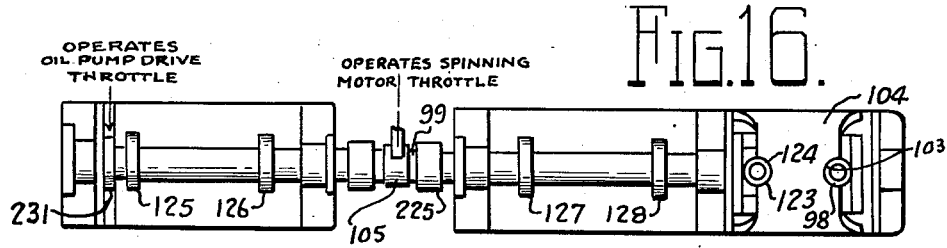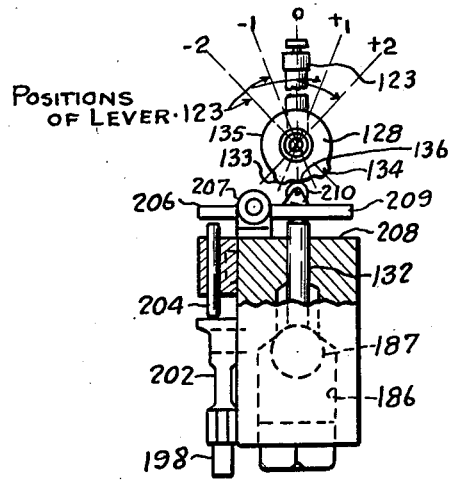

Patented May 26, 1953

2,639,894

UNITED STATES PATENT OFFICE 2,639,894

PIPE AND CASING TONGS

Fred E. Smith, Findlay, Ohio

Application November 17, 1951, Serial No. 256,940

12 Claims. (Cl. 255—35)

This invention relates to a power wrench for making and breaking joints of pipe such, for example, as drill pipe, casing, tubing and the like used in oil wells.

Many devices have been developed for holding a lower section of pipe having an internally threaded upper end and for threading thereinto or removing therefrom an upper section of pipe having an externally threaded end. In drill stems, to which the present invention is most important, the internally threaded member constitutes the box end of a tool joint and the externally threaded part constitutes the "pin" end of the joint. It is conventional in the oil well drilling art, and most logical when making up a threaded joint, to rapidly rotate the pin for the initial or greater portion of the thread engagement and then to apply controlled force to the pin for the last portion of the engaging turns to set it solidly in the box. The rapid rotation of the pin is referred to as "spinning." The reverse of the above is used for breaking out or unscrewing the drill pipe.

The final tightening of the pin in the box must be carefully controlled in order to prevent damage to the threads of the two pipe sections or overexpansion of the box which readily occurs when the pipes are threaded together with excessive force. However, it also is necessary to apply considerable force because the joints must be tight enough to prevent their inadvertently becoming loose or unscrewing during drilling operations or when the string is being pulled or reinserted in the well.

Mechanisms for accomplishing this purpose have been designed in the past but frequently such prior art mechanisms are not provided with sufficiently sensitive controls to properly set and control the force with which the final tightening is accomplished and thus many prior art mechanisms damage both the pins and boxes during the tightening step. At present joints of this type are made up by use of a cat head to which a spinning line is attached. The taut moving line constitutes a decided hazard to the men engaged in the operation and it is not uncommon for a man to become entangled in the line and suffer severe injury. Such hazard is completely eliminated by the present invention.

It is the principal object of this invention to provide a power driven wrench for assembling sections of drill pipe, casing or tubing pipes, which is provided with mechanism for holding a box and spinning a pin thereinto and for applying controlled, almost purely torque-like force, to the pin for tightening the joints or initiating a break.

It is a further object of this invention to provide such a mechanism having simple fool-proof controls and provided with safety features that prevent the operation of the power means unless and until the various elements of the mechanism are properly positioned and both the box and pin are securely held in the mechanism.

It is yet another object of this invention to provide a wrench for assembling and disassembling strings of drill pipe, casing or tubing pipe which can easily be moved out of the way when not in use and which is provided with simple manually actuated, interchangeable means for grasping pins and boxes of different diameters and with simple control means for varying the force supplied in the tightening operation depending upon the diameter of the pin and box being threaded together.

More specific objects and advantages will become apparent from the description which follows and from the drawings, in which:

Fig. 2 is a plan view of the wrench shown in Fig. 1 and illustrating how the pin grasping elements are openable to permit insertion and removal of a pin being stabbed into a box.

Fig. 3 is a vertical sectional view with parts broken away taken substantially along the line 3—3 of Fig. 2.

Fig. 4 is a fragmentary horizontal sectional view taken substantially along the line 4—4 of Fig. 3.

Fig. 5 is a fragmentary vertical sectional view taken on the line 5—5 of Fig. 1.

Fig. 6 is a schematic view of a hydraulic system and the controls therefor for actuating a wrench embodying the invention to tighten or loosen a pin in a box.

Fig. 7 is a detailed view in elevation taken from the position indicated by the line 7—7 of Fig. 6.

Fig. 8 is a schematic view similar to a portion of Fig. 6 but showing the hydraulic system valving means as set for rotating a pin or moving the pin rotating portion of the wrench in a counter-clockwise direction (for example, in Fig. 4).

Fig. 9 is a view similar to Fig. 8 but showing the valving mechanism in position to produce clockwise rotation.

Fig. 10 is an enlarged fragmentary detailed plan view with parts broken away showing the pin clamping means and a safety pneumatic circuit designed to prevent the spinning mechanism from being operated before the pin is securely grasped by the pin clamping means.

Fig. 11 is a fragmentary vertical sectional view taken substantially on the line 11—11 of Fig. 10.

Fig. 12 is a detailed vertical sectional view taken substantially on the line 12—12 of Fig. 10.

Fig. 13 is a fragmentary vertical sectional view taken on the line 13—13 of Fig. 12.

Fig. 14 is a fragmentary view in front elevation and on an enlarged scale of the valve control means with which a wrench embodying the invention is equipped and also illustrating certain safety and cutoff valve operating means.

Fig. 15 is a vertical sectional view taken substantially on the line 15—15 of Fig. 14.

Fig. 16 is a plan view of the mechanism shown in Fig. 14.

*Clamping means*

Figure 1:
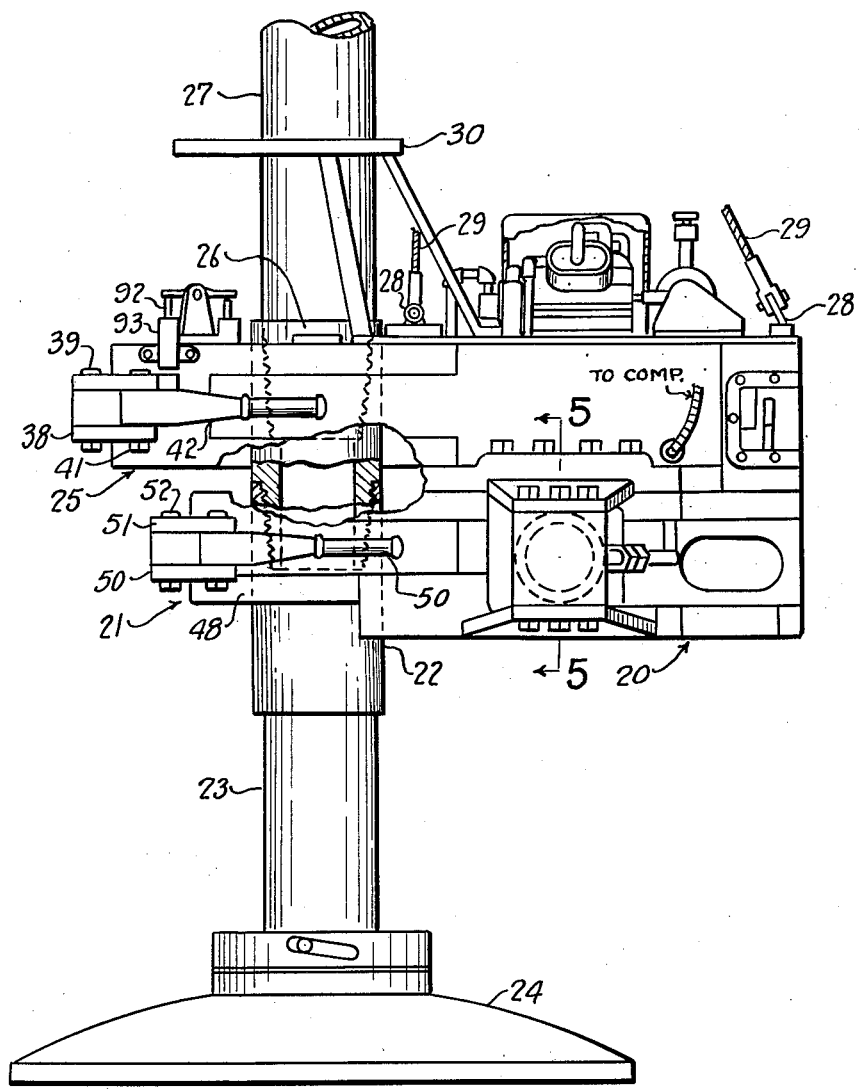
Fig. 1 is an end view in elevation with parts broken away of a wrench embodying the invention.

A wrench embodying the invention may have a major housing generally indicated at 20 and provided with a lower clamping means 21 for tightly grasping a box 22 on the upper end of a tool joint or casing pipe 23 that extends downwardly through a well cover 24. The wrench also has an upper clamping means generally indicated at 25 for tightly grasping a pin end 26 of a second, upper section of pipe 27 which is either being threaded into or removed from the box 22 on the lower section of pipe 23.

The wrench is provided with a plurality of appropriately located eyes 28 to which supporting cables 29 are secured so that the wrench, as a whole, can be moved into and out of position for tightening or loosening joints. The wrench 20 also has a stabbing guide 30 which guides the pin 26 when it is to be stabbed into the box 22. The stabbing guide 30 is secured on the upper surface of the major housing 20.

The pin clamping means 25 (see Figs. 2 and 10) consists of a circular guideway 31 which comprises a semi-annular section 32 fixedly positioned in the housing 20 and two quadrants 33 and 34. Each of the quadrants 33 and 34 is supported on an arm 35 or 36, respectively, each of which is journalled in one of a pair of trunnions 37 that are supported at the rear of the main housing 20 with their vertical axes generally in line with the diameter of the circular guideway 31 along which the quadrants 33 and 34 are parted from the semi-annular section 32.

The quadrant 34 is provided with an over center locking means consisting in a bifurcated link 38 secured on a vertical hinge pin 39 that is studded into an ear 40 formed at the rear of the quadrant 34. The bifurcated link 38 pivotally carries at its opposite end and on a pin 41, a hand locking lever 42 that is provided with a finger 43 which fits into a vertical notch 44 cut in an ear 45 located at the rear of the quadrant 33.

By referring to Fig. 2 it can be seen that when the hand lever 42 is swung on the pin 41 in a clockwise direction its finger 43 is disengaged from the slot 44 and ear 45 and then the handle 42 and bifurcated link 38 can be swung on the pin 39 to release the two quadrants 33 and 34 allowing them to be swung on their trunnions 37 into the position shown in broken lines in Fig. 2 and in Fig. 10. This opens the clamping means 25 for the removal or insertion of a pin 26.

The lower or box clamping means 21 is constructed similarly to the upper clamping means 25, except that a semi-annular portion 46 (see Fig. 3) corresponding to the semi-annular section 32, is not merely a guideway, but directly retains and supports tong grips 47 and each of the two quadrants, for example, quadrant 48 (Fig. 1) and quadrant 49 (Fig. 3) similarly directly act upon the wrench grips 47. The clamping means 21 is provided with a hand actuated lever 50 pivotally connected to a bifurcated link 51 (Fig. 3) that in turn is pivoted on a pin 52 that extends through an ear 53 at the rear of the lower quadrant 49 for clamping the two lower quadrants 48 and 49 together to tighten the wrench grips 47 on the box 22.

The wrench grips 47 consist in elongated grip sections 54 that are mounted in spaced segmental plates 55 secured to each other by a plurality of vertically extending pins 56. A wrench 57 (see Fig. 10) similar to the wrench 47 of the lower clamping means 21 is provided for the upper clamping means 25. The wrench 57 has a plurality of segmental grips 58 which are mounted in four segmental sets of plates 59, 60, 61 and 62, respectively. The pairs of plates 60 and 61 are spaced by pins 63, 64, 65 and 66, being linked to the plates 59 and 62 by the pins 63 and 64, respectively, and to each other through the medium of a pair of toggle links 67 in which the pins 65 and 66 are pivoted. A rocking pin 68 extends vertically between the two toggle links 67 and fits into a generally circular recess 69 formed in a rotatable semi-annular ring gear 70. The ring gear 70 rotates in ways 71 and 72 (see Fig. 3) in the circular guideway 31.

As can best be seen in Fig. 10 the pins 63 and 64 lie along the parting diameter of the guideway 31 at which the semi-annular portion 32 is separated from the quadrants 33 and 34 when they are swung outwardly on their trunnions 37 to open the clamping means 25. The pairs of plates 59 and 62 similarly open when the quadrants 33 and 34 are opened.

The construction of the wrench 47 (located in the lower clamping means 21) is substantially identical with that of the upper wrench 57 except that the lower clamping means 21 does not include the ring gear 70 that is included in the upper clamping means 25.

The two spaced pairs of plates 59 and 62 which comprise the openable sections of the wrench 57 are provided with engaging teeth 73, carried by the plates 59, and teeth 74, carried by the plates 62. The teeth 73 and 74 overlap and engage when the pairs of plates 59 and 62 are swung inwardly to engage the grippers 58 with the exterior surface of the pin 26.

The ring gear 70, in common with the guideway 31, has a semi-annular section 75 corresponding to and associated with the semi-annular section 32 of the guideway 31 and also has a pair of quadrant-like sections 76 and 77 which correspond to and are associated with the quadrants 33 and 34 of the guideway 31. The ring gear 70 is provided with two sets of teeth forming a lower spur gear 78 (Fig. 3) and an upper bevel gear 79 formed at the lower edge of the ring gear 70 and the upper outside corner thereof, respectively.

The ring gear 70, including its semi-annular section 75 and its two quadrant-like sections 76 and 77, rotates as a unit in the guideway 31 when the semi-annular section 32 and two quadrants 33 and 34 are clamped together in closed position.

The quadrant-like sections 76 and 77 of the ring gear 70 are provided with correspondingly shaped lips 80 (see Figs. 3 and 10) which support a plurality of circumferentially spaced springs 81 (see Fig. 3) that support the sections of the upper wrench 57 in and on the rotatable ring gear 70. As can best be seen by reference to Fig. 3, when the rotatable ring gear 70 is closed, it forms a vertically extending generally tubular central socket 82 in which the wrench 57 is positioned. Because of the construction of the toggle links 67 and teeth 73 and 74 of the wrench 57 the torque transferred to the wrench 57 acts also to tighten the wrench 57 on the pin 26. A substantial portion, of course, of the torque transferred from the rotatable ring gear 70 to the wrench 57 is transferred between the recess 69 and the rocking pin 68 which fits therein. This tends to twist the toggle link 67 in a clockwise direction (Fig. 10) clamping the wrench 57 tightly on the pin 26. The springs 81 support the wrench 57 in the rotatable ring gear 70 and allow the wrench 57 to move vertically in the socket 82 as the pin on which the wrench 57 is clamped, moves vertically while it is being threaded downwardly into the box 22.

The above explanation applies only when the wrench 57 is in place as shown in Figs. 2 and 10 to rotate the pin 26 in a clockwise direction, i. e., for tightening the pin 26 in the box 22. When it is desired to disjoint pipes the wrench 57 is lifted vertically out of the socket 82 in the driven ring gear 70, turned over and reinserted into the socket 82, thereby reversing the toggle link 67 so that upon driving the wrench 57 in a counterclockwise direction the wrench elements will be tightened and the grippers 58 tightly pressed against the exterior of the pin 26 to rotate it in a counterclockwise direction.

In order to provide for the appropriate positioning of the rotatable ring gear 70 and the wrench 57 with respect to the annular guideway 31, i. e., so that the semi-annular and quadrant-like sections of the three concentric structures lie along the same radial lines, and thus in order to provide that they can be opened as shown in Figs. 2 and 10, the annular ring gear 70 is provided with an index 83 and the annular guideway 31 has a corresponding index 84 which, when in registry, indicate that the sections of the three concentric structures also are in registry.

In order to prevent the two quadrant-like sections 76 and 77 of the rotatable ring gear 70 from falling out of the two quadrants 33 and 34 of the guideway 31, when the quadrants are open, spring detent means as indicated in Figs. 11 and 13 are provided and, in the case of the structure of Fig. 13, the detent is combined with the structure of Fig. 12 to prevent the upper clamping means 25 from being opened unless the two indexes 83 and 84 are in registry. Each of the quadrant-like elements 76 and 77 has a notch 85 in its upper surface (see Figs. 11, 12 and 13). The notches 85 in the quadrant-like sections 76 and 77 are engaged by rollers 86 carried in the lower ends of spring pressed plungers 87 that are in turn supported by brackets 88 mounted upon the quadrant 33 or 34 as the case might be. Engagement of the rollers 86 in the notches 85 secures the quadrant-like sections 76 and 77 in the quadrants 33 and 34 respectively.

In the case of the spring pressed plunger 87 which is mounted in the bracket 88 carried by the quadrant 33 (Fig. 12), a pin 89 extends upwardly through the top of the bracket 88 where it is in line with one end of a short lever 90 pivoted in a pedestal 91 also mounted upon the quadrant 33. The other end of the lever 90 is in line with a pin 92 which slides vertically in a tubular housing 93 secured to the side of the quadrant 33 and which pin has a lower end (see also Fig. 1) that is in line with a hole 94 drilled in a boss 95 formed on the hand lever 42.

Thus when the quadrant-like section 76 of the rotatable annular gear 70 is not lined up in its quadrant 33, and thus the roller 86 is not lowered into the recess 85 but is on the surface of the quadrant-like section 76, the lever 90 is rocked slightly counterclockwise from the position shown in Fig. 12 and the pin 92 is forced downwardly into the socket 94, locking the handle 42 in position. It is impossible, therefore, to swing the handle 42 up to open the upper clamping means 25 unless the several concentrically located mechanisms are appropriately positioned as indicated by registry of the two indexes 83 and 84 on the rotatable ring gear 70 and annular guideway 31 respectively.

The rotatable annular ring gear 70, by reason of its having two sets of gear teeth 79 and 80, can be rotated by two separate mechanisms, the first of these being the spinning mechanism and the second being the tightening mechanism. The spinning mechanism will first be described.

*Spinning mechanism*

The pin 26, when stabbed into the box 22, is first locked in the upper clamping means 25 and then is spun into the box 22. The spinning action, which consists in high speed rotation of the pin 26, is produced by a pneumatic spinning motor 96 (see Fig. 2) on the shaft of which there is pinned a bevel pinion 97 (see also Figs. 3 and 10). The bevel pinion 97 is meshed with the bevel gear 79 formed on the upper shoulder of the ring gear 70. The spinning motor 96 is reversible and under the control of a hand lever 98 (Figs. 2 and 14) that is secured on the right end of a horizontally extending shaft 99 (Fig. 14) extending through the center of a hollow hydraulic control shaft 100. The shafts 99 and 100 are journalled in bearing blocks 101 erected on the top of the main housing 20 and extending transversely thereto. The hand lever 98 is provided with a depressible locking latch 102 which must be thrust downwardly by the operator's thumb in order to disengage a dog (not shown) from a notch 103 (Fig. 16) cut in the edge of a generally cylindrical hand lever guide 104. The center shaft 99 carries a cam 105 at its centermost position, the cam 105 in turn being engaged with appropriate control levers 106 (Fig. 2), not shown in Figs. 14 and 16, for controlling the spinning motor 96. By moving the hand lever 98 in either direction from its neutral position, the spinning motor is connected to pneumatic system to rotate the bevel pinion 97 in one direction or the other thus rotating the ring gear 70 in a corresponding direction so as to spin the pin 26 into or out of the box 22.

In order to prevent the inadvertent energization of the spinning motor 96 when the pin 26 is not properly locked up in the upper clamping means 25, a safety control is inserted in the pneumatic system. This control is illustrated in Fig. 10. A line 107 leads from an air compressor to the interior of a valve chamber 108 where a spring pressed ball valve 109 normally prevents air from flowing into a pneumatic line 110 that leads from the valve chamber 108. A longitudinally slidable rod 111 is mounted in webs of the main casting 20 with one end extending into the space between the joining faces of the guideway 31 and quadrant 33. A spring 112 holds the rod forward when the quadrant 33 is not in closed position. The other end of the rod 111 is in line with a valve plunger 113 that extends into the valve chamber 108 and which, when moved into the chamber 108, moves the valve 109 away from its seat compressing the spring which normally presses the ball 109 into its socket.

A similar arrangement consisting of a valve chamber 114, a spring pressed ball valve 115, a valve plunger 116 and a spring urged rod 117 is similarly arranged with respect to the quadrant 34, the valve chambers 108 and 114 being in series with the lines 107 and 140 and with a line 118 leading from the chamber 114 to the spinning motor. Another pneumatic line 119 leads to an oil pump drive motor not shown in the drawings, but the connection of which is indicated by legend in Fig. 10. A third air line 120 similarly leads to an air line 121 for a signal whistle 122 (see Fig. 6) the purpose for which will later be explained.

Because the valve chambers 108 and 114 are in series between the air compressor and the spinning motor, oil pump driving motor and whistle, none of these three actuating and signalling means can be operated until the upper clamping means 25 is closed and the inner faces of the quadrants 33 and 34 have pushed the rods 111 and 117, compressing their springs, inserting the plungers 113 and 116 into the valve chambers 108 and 114 and opening the valves controlled by the balls 109 and 115.

This interlock between the upper clamping means 25 and the operative elements of a wrench embodying the invention insures that the wrench will not inadvertently be operated while it is opened since, of course, such operation would mangle the various operative elements of the device.

The spinning motor is used not only to spin the pin 26 into the box 22 but also to spin the pin 26 out of the box 22 after it has initially been loosened and to back off the wrench 57 and rotate it the necessary distance to re-align the indexes 63 and 64 either after the pin 26 is tight or after it is completely unthreaded and it is desired to open the upper clamping means 25.

*Controls for tightening mechanism*

The tightening mechanism which is embodied in a wrench according to the invention consists in apparatus for applying substantially pure torque to the pin 26. The apparatus acts through the ring gear 70 and wrench 57.

The tightening mechanism is controlled by a hand lever 123 (see Figs. 2 and 14–16 particularly) which is secured to the right end of the hollow shaft 100 and provided with a thumb operated release latch 124. The hand lever 123 has five positions, the centermost being the neutral position and two positions on each side of neutral, the purposes for which and the results at each position to be later explained.

Four control valve actuating cams 125, 126, 127 and 128 are secured on the hollow shaft 100 and engageable with the upper ends of corresponding pins 129, 130, 131 and 132, respectively (see Figs. 6–9).

Each of the four cams 125–128 has two high operating surfaces 133 and 134 (see Fig. 15) which depress the pins 129–132, respectively, when the cams are appropriately rotated by movement of the hand control lever 123. Each cam also has two low operating surfaces 135 and 136 and a neutral position located centrally of the four operating surfaces. In the case of the cam 128, for example (see Fig. 15), the high surfaces 133 and 134 are so spaced that the pin 132 is depressed at the minus 1 and plus 2 positions; the low surfaces 135 and 136 being spaced to permit the pin 132 to remain up at minus 2 and plus 1 positions. The positioning of the high and low surfaces on the other cams 125–127, inclusive, will appear from the following description of the operation of the device in connection with Figs. 6–9 of the drawings and by reference to Tables I and II below.

The hand control lever 123 rocks through a maximum angular movement of 90° and, having five positions, each position on the surface of the cam is 22½° away from an adjacent position. The five positions of the lever 123 and corresponding direction of rotation of the wrench mechanism are shown in the following table:

TABLE I

| Position of lever 123 | Movement | Illustrated |
|---|---|---|
| minus 2 | clockwise rotation | Fig. 9. |
| minus 1 | counterclockwise rotation | Fig. 8. |
| neutral—"0" | none | none. |
| plus 1 | clockwise rotation | Fig. 9. |
| plus 2 | counterclockwise rotation | Fig. 8. |

The hydraulic system by which the movement of the wrench mechanism is controlled operates to control the movement of a pair of actuating rams 137 and 138 (see Figs. 5 and 6) which are linked together at their inner ends by being yoked to a pin 139 that extends upwardly and is secured to a heavy arm 140 of a wrench-swinging crank 141. The rams 137 and 138 are given the designations "#1" and "#2" in the drawings in order to simplify correlation between figures. Each of the rams 137 and 138 is located in a cylinder 142 or 143, respectively, which are positioned in a pair of elongated chambers 144 and 145, respectively (see Fig. 2).

Referring again to Fig. 6, the hydraulic system includes an oil reservoir 146 which is connected to an oil pump 147 and to an oil return line 148. A hydraulic line 149 connects the oil pump 147 to a pressure regulating valve 150 that is provided with a pressure indicating gauge 151 and a regulating hand wheel 152. The line 149 leads into a block 153 of the valve 150 where it intersects a line 154 leading to the gauge 151 and a line 155 leading to a pressure line 156 that is connected with a valve manifold generally indicated at 157. A spring pressed plunger 158 is located in a sleeve 159 that slides in a bore 160 in the block 153 and acts upon a ball valve 161 closing a line 162 that also intersects the lines 149, 154 and 155. A second plunger 163 extends into the bore 160 and presses on the opposite end of a spring 164 which is located in the sleeve 159 and presses on the plunger 158. The outer end of the plunger 163 is radially spaced from the center of the hand wheel 152 the same distance as a plurality of adjustable positioning pads 165 on the hand wheel 152. By rotating the hand wheel to position a different one of the pads 165 back of the plunger 163, the plunger can be positioned in the sleeve 159 to preload the spring 164 and thus the ball valve 161 for preselected hydraulic pressures at which the ball valve 161 will open.

A chamber 166 inside the block 153 and behind the ball valve 161 is in direct communication with the return line 148 to the oil reservoir 146 when a piston 167 that normally blocks the passageway between the chamber 166 and the return line 148 is moved backwardly compressing its spring 168. The piston 167 is on the front end of a push rod 169 which extends out of the valve block 153 and is engaged with the trip lever 170 of the whistle 122.

Thus when the pressure of the oil pumped from the pump 147 to the pressure line 156 and thence through the valve manifold 157 to one of the rams 137 or 138 reaches a point predetermined by the setting of the hand wheel 152, and thus, for example, the pin 26 is tightened sufficiently into the box 22, the ball valve 161 is displaced and hydraulic fluid at the predetermined pressure enters the chamber 166, displacing the piston 167 and flowing immediately into the return line 148 back to the oil reservoir. The oil merely recirculates from pump to reservoir when sufficient hydraulic force has been applied to the ram being used to tighten the pin 26 in the box 22. This occurrence is indicated to the operator because the displacement of the piston 167 by the oil entering the chamber 166 trips the lever 170 and sounds the whistle 122. At this point the operator moves the hand lever 123 in a manner to be described, stopping the tightening operation.

The pressure line 156 leading from the oil pump 147 is connected in the manifold 157 to a pair of leads 171 and 172. The lead 171 enters a valve chamber 173 below a ball valve 174 that is urged upwardly by a spring 175 and which is engaged with the lower end of the pin 130 actuated by the cam 126 on the control shaft 100. The upper portion of the chamber 173 is connected by means of a lead 176 to the lower portion of a second valve chamber 177 which is equipped with a ball check 178 urged upwardly by a spring 179 and in contact with the lower end of the valve pin 129. The lower portion of the chamber 177 also communicates with a main ram lead 180 which is connected to the cylinder 142 of the ram 137, "#1."

The upper end of the valve chamber 177 above the ball 178 is connected to a return lead 181 which in turn connects to the return line 148 and to the reservoir 146.

Similarly, the hydraulic lead 172 communicates with the lower end of a valve chamber 182 in which is located a ball check 183 urged upwardly by a spring 184 and controlled by the pin 131 that is actuated by the cam 127. The upper end of the chamber 182 is connected by a lead 185 to a second chamber 186 having a ball check 187 pressed upwardly by a spring 188 against the lower end of the pin 132 that is controlled by the cam 128. As is the case with the other valve chambers already described, the chamber 186 is connected below the ball check 187 by a lead 189 to the cylinder 143 in which is located the ram 138, "#2." The chamber 186 is connected by a line 190 located above the ball check 187 to the return line 148 and to the oil reservoir 146.

Referring now to Fig. 9, the mechanism constituting the hydraulic control for the rams "#1" and "#2" is shown in the position for advancing the ram "#2" and rotating the wrench crank 141 in a clockwise direction. The hand lever 123 is moved to rotate the shaft 100 to swing the four cams 125, 126, 127 and 128 into positions to depress the pins 129 and 131, lowering the ball checks 178 and 183, so that oil under pressure flows from the pump line 156 through the valve chamber 182 and beneath the check 187 to the cylinder 143 advancing the ram 138 (#2) in the cylinder 143. At the same time the cam 125, by depressing the pin 129, opens the check 178 and places the cylinder 142 in communication with the return line 148 through the line 180, valve chamber 177 and line 181. Oil under pressure thus forces the ram "#2," 138, outwardly from its cylinder 143 and oil behind the ram "#1," 137, is allowed to be displaced from the cylinder 142.

Fig. 8 shows the position of the cams on the shaft 100 to swing the wrench 141 in a counterclockwise direction. The cams 126 and 128 force the pins 130 and 132, respectively, downwardly to depress the ball checks 174 and 187, respectively, establishing connections which are the reverse of those described with reference to Fig. 9. When the lever 123 is set as indicated in Fig. 8, oil under pressure flows from the pump line 156 into the valve chamber 173 past the ball check 174 and through the passageway 176 to the valve chamber 177, then through the lead 180 into the cylinder 142 to advance the ram "#1," 137, and rotate the wrench crank 141 in a counterclockwise direction. Again, similar to the arrangement of Fig. 9, the cam 128, by depressing the pin 132, opens the valve chamber 186 by moving the ball check 187 downwardly and oil is allowed to escape from the cylinder 143 through the line 189, the valve chamber 186 and the line 190 to the return lead 148 and the oil reservoir 146.

The alternate arrangement of the control positioning is designed so that by moving the lever 123 to either of the first positions an operator can precondition the wrench for a full driving stroke. For example, if the lever is first moved to position minus 1, ram "#1" is extended out of and ram "#2" depressed into their respective cylinders 142 and 143, thus moving the rams and the wrench-swinging crank 141 to the limit of their travel in a counterclockwise direction, preparatory to driving the rotatable wrench 57 and the pin 26 in a clockwise direction. At this point auxiliary valving means to be described below, operates to change the valve set up and to stop the movement of the rams "#1" and "#2" and the wrench-swinging crank 141, so that when the operator moves the lever 123 to position minus 2, the valving mechanism is reversed to the condition shown in Fig. 9 and the ram "#2" extended to rotate the wrench-swinging crank 141 in a clockwise direction under pressure, tightening the pin 26 in the box 22.

Referring now particularly to Figs. 3, 4, 5, 10–14 and 15, it will be observed that the wrench crank 141 has a yoke portion 191 (Figs. 3 and 4) which is rotatably mounted in a way 192 in the guideway 31 and which is integral with the heavy arm 140 of the crank 141. The arm 140 also has an outwardly extending finger 193 which mounts a position indicator 194 that is visible through an arcuate window 195 on the front of the main housing 20 and which swings on a horizontal plane. The pin 139 which connects the crank 141 to the rams 137 and 138 extends downwardly through an arcuate slot 196 (Fig. 5) in a web of the main casting 20 and the finger 193 swings horizontally above a horizontal web of the main housing 20 and in line between a pair of downwardly extending pins 197 and 198 (see Fig. 14).

The pins 197 and 198 are studded in a pair of blocks 199 mounted on opposite ends of a tie rod 200 that is in turn pivotally connected to the lower ends of a pair of bell cranks 201 and 202. The other arms of the bell cranks 201 and 202 are in line with the lower ends of a pair of short pins 203 and 204, respectively, the upper ends of which are in line with the ends of a pair of short levers 205 and 206, respectively (see also Fig. 15). Using the lever 206 as an example, it is pivotally mounted in an ear 207 formed on the upper side of a cover 208 of the main casting 20 and its other arm 209 carries a small roller 210 which rolls on the surface of the associated cam 128. The arm 209 of the lever 206 thus is operatively interposed between the cam 128 and the vertically movable pin 132 which actuates the ball check 187 in the valve chamber 186.

Similarly, an actuating arm of the lever 205 is interposed between the cam 125 and the pin 129 which actuates the ball check 178 in the valve chamber 177.

Continuing the operation discussion with respect to the movement by the operator of the lever 123 to position minus 1, thus establishing the operative conditions illustrated in Fig. 8 and rotating the wrench tightening crank 141 in a counterclockwise direction by feeding oil under pressure to the cylinder 142 of the ram "#1"; when the finger 193 of the wrench tightening crank 141 strikes the pin 198 (Fig. 14) it shifts the tie rod 200 to the right (Fig. 14) rotating the bell crank 201, raising the pin 203, swinging the lever 205, thrusting the ball actuating pin 129 downwardly and connecting the valve chamber 177 to its oil return lead 181. Oil under pressure thus circulates, by-passing the line 180 to the cylinder 142 for the ram "#1," and stopping the counterclockwise movement of the wrench crank 141.

The operator then moves the lever 123 to the position minus 2, to move the valves into the position illustrated in Fig. 9, driving the ram "#2" outwardly and rotating the wrench crank 141 in a clockwise direction. The stroke of the piston #2 driving the crank 141 is controlled by the engagement between the finger 193 and the pin 197 (Fig. 14), in this instance pulling the tie rod 200 to the left, swinging the bell crank 202, thrusting the pin 204 upwardly tilting the lever 206 and depressing the pin 132 to depress the ball check 187 and cause the pressure oil then flowing through the valve chamber 186 and line 189 to the cylinder 143, to be deflected and to flow around the ball check 187 and out of the line 180 to the return line 148 and the oil reservoir 146.

Similar conditions are encountered and similar operations take place when the operator swings the lever 123 into positions plus 1 and plus 2, the rams and wrench crank 141 being first swung in a clockwise direction until the finger 193 strikes the pin 197 (Fig. 14) to open the passageway around the ball check 187 and then, when the operator moves the lever into the position plus 2, setting the controls as illustrated in Fig. 8, to rotate the mechanism in a counterclockwise direction until the limit is reached by engagement between the finger 193 and pin 198.

*Wrench drive for tightening mechanism*

The wrench crank 141, the actuation of which in both clockwise and counterclockwise direction has been described, serves to rotate the ring gear 70 through the medium of mechanism which will now be described. The mechanism connecting the ram actuated wrench crank 141 to the ring gear 70 consists in means for selectively engaging two pawls 211 and 212 (Figs. 3 and 4) with the spur gear 78 on the ring gear 70. The pawl 211 is engaged when it is desired to rotate the ring gear 70 in a counterclockwise direction and the pawl 212 is engaged when it is desired to rotate the ring gear 70 in a clockwise direction. Each of the pawls 211 and 212 is rockingly mounted upon one of a pair of vertically extending pins 213 which are studded in the arm 140 of the wrench crank 141. Each of the pawls 211 and 212 is provided with a compression spring 214 tending to swing the respective pawl in a direction to engage with the spur gear 78 on the ring gear 70. A wedge 215 is mounted between the pawls 211 and 212 with its sides engaged with shoulders 216 on the pawl 211 and 217 on the pawl 212, respectively. The wedge 215 is rockingly mounted upon a vertically extending pin 218 on the upper end of which there is fixedly secured an arm 219 which carries a roller 220 on its other end. The roller 220 is engaged in an arcuate slot 221 cut on a center coinciding with that of the pin 26 being handled, in a slidable control sector 222 guided for horizontal reciprocatory movement by a pair of pins 223 engaged in bores 224 drilled in the arms of the stationary guideway 31 and located on opposite sides of the rotatable ring gear 70.

The sector 222 is reciprocated horizontally along a line perpendicular to the path of movement of the rams 137 and 138 by mechanism also under the control of the hydraulic actuating control lever 123. A pair of bell cranks 225 (Figs. 3 and 14) are secured to the shaft 100 near its center and carry a horizontal roller 226 which extends into a yoke 227 that is fixed on the upper surface of a cylindrical extension 228 of the sector 222. The roller 226 loosely fits in the yoke 227, sufficient play being provided so that the roller 226 does not engage the wings of the yoke 227 when the lever 123 is moved to positions minus 1 or plus 1.

At the underneath side of the extension 228, notches 229 (Fig. 3) are engageable by a spring pressed detent 230, there being three of the notches 229 corresponding to the neutral and plus 2 and minus 2 positions of the actuating lever 123.

When the actuating lever 123 is moved into minus 2 position, for example, the bell cranks 225 are swung in a clockwise direction (Fig. 3) to move the sector 222 inwardly (to the left in Figs. 3 and 4). The inward movement of the sector 222 acting through the walls of its slot 221 moves the roller 220 inwardly, swinging the arm 219 in a counterclockwise direction (Fig. 4) and rotating the wedge 215 similarly in a counterclockwise direction, which swings the corner of the wedge 215 away from the shoulder 217 of the pawl 212. The spring 214 can thus expand and swing the pawl 212 in a counterclockwise direction on its pin 213 to engage the teeth of the pawl 212 with the spur gear 78 on the annular ring gear 70.

As earlier explained, movement into position minus 2 sets the valving mechanism so that oil under pressure is admitted into the cylinder 143 behind the ram "#2" to swing the wrench crank 141 in a clockwise direction. With the pawl 212 engaged with the ring gear 70, the clockwise rotation of the wrench crank 141 rotates the ring gear 70 in a clockwise direction in turn tightening the wrench 57 on the pin 26 and rotating the pin 26 in a clockwise direction.

Similarly, when the control lever 123 is swung to the position plus 2 the sector 222 is moved outwardly (to the right in Figs. 3 and 4) swinging the arm 219 and wedge 215 in a clockwise direction removing the shoulder of the wedge 215 from behind the shoulder 216 of the pawl 211 and allowing its spring 214 to swing the pawl 211 into the engagement with the annular ring gear 70. Movement of the control lever 123 to position plus 2 also admits pressure oil behind the ram "#1" to drive the wrench crank 141 in a counterclockwise direction and through the pawl 211 to rotate the annular ring gear 70 in a counterclockwise direction swinging the wrench 57 in a counterclockwise direction and unthreading the pin 26 from the box 22.

Positions minus 1 and plus 1 are designed to permit the operator to retract the mechanism to the limit of its travel before engaging the driving pawls 211 or 212 with the ring gear 70. Because of the play between the roller 226 and yoke 227, the pawls 211 and 212 are not swung inwardly into engagement with the ring gear 70 until the control lever 123 is moved to either minus 2 or plus 2 position.

The following table correlates the positions of the control lever 123 and valve actuation with the actuation of the rams "#1" and "#2" and resulting movement of the wrench crank 141 and pawls 211 and 212 to rotate the ring gear 70 and the pin 26:

TABLE II

| Position of Control Lever 123 | Ram Advanced | Valve Pin Settings | | | | Illustrated at— | Movement of Wrench 141 | Pawl Engaged | Movement of Gear 70 and Pin 26 |
| --- | --- | --- | --- | --- | --- | --- | --- | --- | --- |
| | | 129 | 130 | 131 | 132 | | | | |
| Minus 2 | #2 | Down | Up | Down | Up | Fig. 9 | c | 212 | c. |
| Minus 1 | #1 | Up | Down | Up | Down | Fig. 8 | cc | None | None. |
| Neutral | None | do | Up | do | Up | Fig. 6 | None | do | Do. |
| Plus 1 | #2 | Down | do | Down | do | Fig. 9 | c | do | Do. |
| Plus 2 | #1 | Up | Down | Up | Down | Fig. 8 | cc | 211 | cc. | c.=clockwise.  cc.=counterclockwise.

From Table II it can be determined that the cams 125, 126 and 127 are designed similarly to the cam 128 but with their high and low operating surfaces placed to depress or to allow the pins 129–132 to move up as indicated.

In addition to the four valve operating cams 125–128 and the cranks 225, the hollow shaft 100 also carries an oil pump control cam 231 (Figs. 14 and 16) which controls the operation of the oil pump 147 when the operating lever 123 is moved into any one of the four operating positions.

Whether the rams "#1" and "#2" (137 and 138 respectively) are being used to move the wrench crank 141 to the end of its stroke preparatory to rotating the ring gear 70, i. e., with the control lever 123 in the positions minus 1 or plus 1; or whether the rams "#1" and "#2" are being employed to actually rotate the ring gear 70 and thus to rotate the pin 26, i. e., with the control lever 123 in positions plus 2 or minus 2, the stroke limiting mechanism consisting of the pins 197 and 198 (Fig. 14) operates to stop the movement of the wrench 141 at the limit of the stroke of the driving one of the rams "#1" and "#2."

After the operator has moved the control lever 123 into position plus 2 or position minus 2 as the case might be, and after an operating stroke has been delivered by the ring gear 70 and wrench 57 to the pin 26, it is necessary to disengage that one of the driving pawls 211 or 212 from the ring gear 70 and to return the mechanism to the other end of the stroke of the rams 137 and 138. The operator accomplishes this movement by, for example, swinging the lever from position minus 2 in which it has been placed to drive the gear 70 and pin 26 in a clockwise or tightening direction, to the position minus 1. As can be seen from Table II above this reverses the valving mechanism, disengages the pawl 212 and returns the wrench crank 141 in a counterclockwise direction to the end of its stroke. Arrival at the end of the stroke in a counterclockwise direction is signalled by the operation of the limiting mechanism involving the pins 197 and 198 (Fig. 14) and the operator can at any time observe the relative position of the wrench crank 141 by viewing its indicator 194 through the arcuate window 195 in the front of the housing 20.

Thus, if an operator is assembling a long string of drilling pipe or casing elements, he stabs a pin into a box, locks the upper clamping means 25 to clamp the pin in the wrench 57, spins the pin 26 into the box 22 through the medium of the spinning motor under the control of the hand lever 98, and, when the pin is substantially tightened in the box, moves the control lever 123 between the positions minus 1 and minus 2 to apply successive driving strokes to the wrench tightening crank 141 and to the pin 26 until it is tightened in the box 22 with a force sufficient that the hydraulic pressure in the pressure side of the hydraulic system reaches a point where it displaces the safety ball check 161 of the pressure valve mechanism, stops the tightening action and blows the signal whistle 122.

At this point the operator moves the control lever 123 into position minus 1 to return the wrench crank 141 to center with the pawls 211 and 212 disengaged and then, reversing the spinning motor 96 drives the ring gear 70 in a counterclockwise direction to slack off the wrench 57 until the index 83 coincides with the index 84 on the annular guideway 31. The operator can then open the upper clamping means 25 and the lower clamping means 21, lower the coupled string into the well and reset the lower clamping means 21 on the box end of the last coupled pipe section. He then stabs in a new pin 26 and repeats the operation.

Diassembly of a string of pipe involves the reverse of these steps outlined above with the hydraulically operated wrench crank 141 being first employed to loosen or "break" the joint between the pin 26 and box 22 being disassembled and the spinning motor 96 then being employed in reverse to spin the pin out of the box 22.

While the invention has been disclosed in conjunction with a specific form of the parts, various modifications and changes will suggest themselves to those skilled in the art, and it should be expressly understood that such modifications may be made within the scope of the invention as defined in the appended claims.

What I claim is:

1. A power tongs mechanism for assembling and disassembling lengths of pipe comprising, in combination, clamping means for holding a standing length of pipe having a joint element, a rotatable wrench for grasping and rotating an upper length of pipe having a mating joint element, means comprising an openable clamp for securing such upper pipe in said wrench, first power means for rotating said wrench at high speed, and second power driven means for rotating said wrench with high torque, said wrench having a peripheral gear, said second power driven means comprising a reciprocal drive element and a pair of toothed power transfer means driven thereby and alternatively engageable with said peripheral gear.

2. A power tongs mechanism for assembling and disassembling lengths of pipe comprising, in combination, clamping means for holding a standing length of pipe having a joint element, a rotatable wrench for grasping and rotating an upper length of pipe having a mating joint element, means comprising an openable clamp for securing such upper pipe in said wrench, first power means for rotating said wrench at high speed, and second power driven means for rotating said wrench with high torque, said wrench having a peripheral gear, said second power driven means comprising a reciprocal drive element, an oscillatable wrench crank actuated thereby, and a pair of toothed power transfer means mounted on said crank and alternatively engageable with said peripheral gear.

3. In a power tongs mechanism according to claim 2 the improvement consisting in toothed power transfer means having arcuate toothed sections of more than one tooth and engageable with said peripheral gear.

4. In a wrench mechanism of the class described a rotatable pipe grasping wrench, a peripheral gear on said wrench, an oscillatable wrench crank, a pair of alternatively engageable pawl means on said crank for drivingly engaging said gear, hydraulic means for oscillating said crank and a single control for said hydraulic means and said pawl means whereby said crank is selectively oscillatable when neither of said pawl means is engaged and said crank is selectively oscillatable in either direction when a corresponding one of said pawl means is engaged.

5. A mechanism according to claim 4 in which said control means has a neutral position in which neither of said pawls is engaged, a pair of opposite first positions in which said hydraulic means is connected to swing said crank, and a pair of second positions in which said hydraulic means is connected to swing said crank and in each of which second positions one of said pawls is engaged for rotating said wrench.

6. Control and drive mechanism for a pipe tongs having a rotatable wrench with a peripheral gear, and a co-axial wrench swinging crank having a pair of pawls alternatively engageable with said gear; said mechanism comprising a pair of opposed hydraulic rams linked to said wrench, a source of fluid under pressure, valve means for selectively connecting said source to said rams, a single control lever for actuating said valve means, and linkage connecting said lever to said pawls for alternatively engaging one of said pawls with said gear.

7. Control and drive mechanism according to claim 6 in which said lever has a neutral position, a first position on each side of neutral in which the valve means are actuated to drive one of the rams for swinging the wrench crank in the corresponding direction and a second position on each side of neutral in which said valve means are actuated for swinging said crank in a direction opposite to that of the adjacent first position and in which second position the linkage is actuated to engage the corresponding one of the pawls with the peripheral gear for rotating said wrench.

8. In a pipe tongs of the class described, a stationary clamp having a semi-annular section and two quadrant sections pivotally connected thereto, said sections having an inner annular guideway, an annular wrench element having corresponding separable sections and being mounted in said guideway for rotation, power means for rotating said wrench element, and cooperating means on said clamp and on said wrench element for locking said clamp in closed position unless the sections of said wrench are angularly aligned with the sections of said clamp.

9. In a pipe tongs according to claim 8, power means disabling mechanism actuated when said clamp is open, whereby said power means is not actuatable for rotating said wrench unless said clamp is closed.

10. Power driven tongs for assembling and disassembling lengths of pipe or similar material, said tongs comprising, in combination, a rotatable openable wrench, removable annular gripper means carried by said wrench and adapted to grip the exterior of a length of pipe to be rotated, said gripper means being reversible to apply gripping force in a desired direction of rotation and to relax gripping force when rotated oppositely therefrom, pneumatically actuated means including a direct gear drive to said wrench for rotating the same at high speed, a hydraulic system including hydraulically actuated means for rotating said wrench at high torque and including multiple tooth alternately engageable driving pawls, teeth on the exterior of said wrench engageable by said pawls, a pneumatically actuated pump for creating hydraulic force in said system, control means for selectively applying force to said wrench and for engaging one of said pawls for the transmittal thereof to said wrench, and a safety disabling mechanism operable when said wrench is open for preventing the actuation of both said pneumatically actuated means including the direct drive and said pump.

11. Power driven tongs according to claim 10 in which the hydraulic system includes a pair of parallel valving systems, opposed hydraulic rams for actuating said means for rotating said wrench, a single control lever for said valving systems, each of said valving systems including a drive valve and a by-pass valve, and a by-pass valve in said system operable at a selected pressure whereby said rams are driven with a maximum force for tightening the pipe to only a selected degree.

12. Power driven tongs according to claim 10 in which the hydraulically actuated means for rotating the wrench at high torque consists in a wrench crank oscillatable about an axis common with said wrench, said crank serving to mount said pair of multiple tooth pawls alternatively engageable with the teeth on said wrench, a pair of opposed hydraulic rams drivingly connected to said crank, valve means for controlling the actuation of said rams, linkage for alternatively engaging said pawls, said control means controlling both said valve means and said linkage and limit means actuated by said crank at the ends of its stroke for over controlling said control.

FRED E. SMITH.

References Cited in the file of this patent
UNITED STATES PATENTS

| Number | Name | Date |
|---|---|---|
| 2,450,934 | Calhoun | Oct. 12, 1948 |
| 2,453,369 | Grable et al. | Nov. 9, 1948 |
| 2,566,999 | Stone | Sept. 4, 1951 |